United States Patent
Murali et al.

(10) Patent No.: US 12,452,125 B2
(45) Date of Patent: Oct. 21, 2025

(54) METHOD AND SYSTEM FOR IMPROVED INTERCONNECTING RING TRANSITION FROM OPEN TO CLOSED STATE IN LC-MODE

(71) Applicant: ALE USA INC., Calabasas, CA (US)

(72) Inventors: Rithesh Gattu Murali, Calabasas, CA (US); Manu Nandhan, Calabasas, CA (US); Vivek Mishra, Calabasas, CA (US); Pranesh Acharya, Calabasas, CA (US); Muthu Krishnan Veeraraghavan, Calabasas, CA (US)

(73) Assignee: ALE USA INC., Thousand Oaks, CA (US)

( * ) Notice: Subject to any disclaimer, the term of this patent is extended or adjusted under 35 U.S.C. 154(b) by 425 days.

(21) Appl. No.: 18/105,172

(22) Filed: Feb. 2, 2023

(65) Prior Publication Data
US 2024/0267284 A1 Aug. 8, 2024

(51) Int. Cl.
*H04L 41/0668* (2022.01)
*H04L 12/437* (2006.01)
*H04L 12/46* (2006.01)
*H04L 43/0811* (2022.01)

(52) U.S. Cl.
CPC ........ *H04L 41/0668* (2013.01); *H04L 12/437* (2013.01); *H04L 12/4637* (2013.01); *H04L 43/0811* (2013.01)

(58) Field of Classification Search
CPC ............... H04L 41/0668; H04L 12/437; H04L 12/4637; H04L 43/0811
See application file for complete search history.

(56) References Cited

U.S. PATENT DOCUMENTS

| | | | |
|---|---|---|---|
| 6,430,151 | B1 | 8/2002 | Glas et al. |
| 10,411,984 | B2 | 9/2019 | Hoglund |
| 11,277,279 | B2 | 3/2022 | Hoglund et al. |
| 2019/0349218 | A1* | 11/2019 | Hoglund ............. H04L 41/0677 |

(Continued)

FOREIGN PATENT DOCUMENTS

WO 2013/078997 A1 6/2013

OTHER PUBLICATIONS

Fiberroad, "Media Redundancy Protocol (MRP) Configuration Guide, Application Note" Rev. APPL-2022.03 ,Mar. 31, 2022 (Year: 2022).*

(Continued)

*Primary Examiner* — Brian J. Gillis
*Assistant Examiner* — Chhian (Amy) Ling
(74) *Attorney, Agent, or Firm* — BCF LLP

(57) ABSTRACT

A method and system are devised for improved Interconnecting ring transition from open to closed state. The Interconnecting ring comprises a Media redundancy Interconnection Manager, MIM and at least three Media redundancy Interconnection Clients, MICs, the MIM being in Link Check, LC, mode. When the Interconnecting ring is in open state, and upon the MIM receiving a first one of first INLNK_UP MRP frames sent by one of the MICs, the MIM starts sending periodic second INLNK_UP MRP frames, changes to Check Interconnection, Interconnection Closed State, CHK_IC, state and the Interconnecting ring to closed state, if the MIM receives one of the second INLNK_UP MRP frames, or a second one of the first INLNK_UP MRP frames.

11 Claims, 3 Drawing Sheets

(56) References Cited

U.S. PATENT DOCUMENTS

2022/0271973 A1* 8/2022 Vavintaparthi ....... H04L 12/423
2022/0368561 A1* 11/2022 Schlennert ............. H04L 41/12

OTHER PUBLICATIONS

IBiome—MRP Configuration Guide 1.15.04-1-EN—Jan. 2023, (#9. MRP Interconnect, p. 5-6), https://is5com.com/CM-MRP-iBiome-1.15.04-1-EN/HTML5/#t=CM-MRP-iBiome-1.15.04-1-EN%2FiMX_Common%2FConfiguration_Guides%2FDITA_Topics%2FMRP%2F2_2_MRP_Configurations.html (Year: 2023).*

"Industrial communication networks—High availability automation networks—Part 2: Media Redundancy Protocol (MRP)", International Standard, Edition 2.0, Mar. 2016, 330 pages.

* cited by examiner

METHOD AND SYSTEM FOR IMPROVED INTERCONNECTING RING TRANSITION FROM OPEN TO CLOSED STATE IN LC-MODE

FIELD

The present technology relates to networking in general, and more particularly to a method and system for improving the transition from Open to Closed state in an interconnecting ring configured in LC-mode.

BACKGROUND

The person skilled in the art is familiar with IEC 62439-2, or Media Redundancy Protocol, MRP, a standard applicable to high-availability automation networks based on the ISO/IEC/IEEE 8802-3 standard, Ethernet. It specifies a recovery protocol based on a ring topology, designed to react deterministically on a single failure of an inter-switch link or switch in the network, under the control of a dedicated media redundancy manager node.

According to the standard, MRP compliant network shall have a ring topology with multiple nodes, typically switches. One of the nodes has the role of a Media Redundancy Manager, MRM. The function of the MRM is to observe and to control the ring topology in order to react on network faults. The other nodes in the ring have the role of Media Redundancy Client, MRC.

To redundantly connect two MRP rings, two nodes of each ring are assigned additional roles. One of the four nodes has the role of a Media redundancy Interconnection Manager, MIM, in addition to the role of a MRC or MRM. The other three have the role of Media redundancy Interconnection Client, MIC. The function of the MIM is to observe and to control the redundant interconnection topology in order to react on interconnection faults. Two fault detection methods are provided by the standard: MIM can observe the interconnection topology by either reacting directly on interconnection port link change notification messages (Link Check, LC-mode) or by sending test frames on the interconnection port over the connected rings and receiving them over its domain ring ports, and vice-versa in the other direction (Ring Check, RC-mode).

This is achieved through MRP frames sent with specific Type-Length-Value, TLV, and through the MRP state-machine of respective nodes. Reaction to any link failure in the ring topology is handled such that the secondary ring port of MRM or the interconnection port of MIM would switch between BLOCKED state or FORWARDING state depending on whether the ring is Closed or Open respectively.

On FIG. 1, switches 101, 102 and 103 form for example a first domain ring (DR1) 104, while switches 105, 106 and 107 form for example a second domain ring (DR2) 108.

Switches 101, 102, 105 and 107 may further form an Interconnecting ring (IR1) 109.

Each of the switches 101-103 and 105-107 features a number of ports (10 are represented as an example) which may be used to connect end nodes (not represented), and as the case may be serve as domain ring ports or interconnection ports depending on the role played by the respective switch vis a vis DR1, DR2 and IR1.

In the first domain ring DR1 104, switch 103 may for example act as a MRM for the domain ring, and feature domain ring ports 103a and 103b.

Still in the first domain ring DR1 104, switches 101 and 102 may act as MRCs for the domain ring, and feature respective domain ring ports 101a, 101b and 102a, 102b.

Similarly, in the second domain ring DR2 108, switch 106 may for example act as a MRM for the domain ring, and feature domain ring ports 106a and 106b, while switches 105 and 107 may act as MRCs for the domain ring, and feature respective domain ring ports 105a, 105b and 107a, 107b.

Between the first domain ring DR1 104 and the second domain ring DR2 108, the Interconnecting ring IR1 109 may be comprised of the switches 101, 102, 105 and 107.

In the Interconnecting ring IR1 109, switch 102 may for example act as a MIM for the Interconnecting ring, while switches 101, 105 and 107 may act as MICs for the Interconnecting ring, their interconnection port being respectively port 102c, 101c, 105c and 107c.

Typically, in this MRP environment, when all links are up in first domain ring DR1 104, MRM 103 sets one of its domain ring ports in BLOCKED state (ex: port 103a), the other domain ring port being in the FORWARDING state (ex: port 103b). This is a normal Ring-Closed state for the domain ring DR1 104, as represented FIG. 1. If a link goes down however in domain ring DR1 104 (this scenario not represented FIG. 1), for example the inter-switch link between MRCs 101 and 102, then MRM 103 sets its domain ring port that is in BLOCKED state (i.e.: 103a) to FORWARDING state. In such a case of failure, the network moves to Ring-Open state.

Conversely, in the domain ring DR2 108, MRM 106 may set its domain ring port (i.e.: 106a or 106b) in BLOCKED or FORWARDING state, based on whether the domain ring DR2 108 is in Ring-Closed or Ring-Open state, depending on the state of switches and inter-switch links in domain ring DR2 108.

Interconnecting ring IR1 109, when all interconnect links are up, is in a normal Interconnect-Closed state, and as represented FIG. 1, MIM 102 sets its interconnection port (i.e.: 102c) in BLOCKED state. If however an interconnect link goes down in Interconnecting ring IR1 109 (this scenario not represented FIG. 1), for example the inter-switch link between MICs 101 and 105, then MIM 102 sets its interconnection port 102c to FORWARDING state. In such a case of failure, the Interconnecting ring IR1 109 moves to Interconnect-Open state.

As per MRP standard, in interconnect LC-mode, the way the network is decided by MIM 102 to be in Interconnect-Open or Interconnect-Closed state, is with MICs 101, 105 and 107 sending INLNK_UP or INLNK_DWN MRP frames. MIM 102 upon receiving such frames decides to set its interconnection port (i.e.: 102c) in BLOCKED state (normal Interconnect-Closed state, as represented FIG. 1), or in FORWARDING state (Interconnect-Open state, not represented).

The present technology results from developers' recognition that in this environment, when a MIC reboots (or such other event happens where its MRP state-machine is down), and before the MRP-state machine of the MIC is up again, the MIC's interconnect link comes up, and a problem may arise associated with complete traffic drop or loss in the interconnecting ring.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art. In particular various aspects of the present technology provide a method of changing an Interconnecting ring, from Interconnect-Open to Interconnect-Closed state, wherein the Interconnecting ring comprises a Media redundancy Interconnection Manager, MIM, and at least three Media redundancy Interconnection Clients, MICs, the MIM being in a Link Check, LC, mode, the method comprising, upon the Interconnecting ring being in an Interconnect-Open state:
- receiving by the MIM a first one of a first set of INLNK_UP MRP frames sent by any one of the MICs;
- sending by the MIM a second set of INLNK_UP MRP frames with a predetermined period between INLNK_UP MRP frames; and
- changing by the MIM to a Check Interconnection, Interconnection Closed State, CHK_IC, state and the Interconnecting ring to an Interconnect-Closed state, if the MIM receives:
  - one of the INLNK_UP MRP frames from the second set; or
  - a second INLNK_UP MRP frame from the first set.

In aspects of the present technology, the predetermined period is approximately 50 mS.

In further aspects of the present technology, the MIM sends INLNK_UP MRP frames of the second set through its interconnection port.

In further aspects of the present technology, the MIM receives INLNK_UP MRP frames of the first set through any of its domain ring ports or its interconnection port.

In further aspects of the present technology, the MIM receives INLNK_UP MRP frames of the second set through any of its domain ring ports.

Various aspects of the present technology also provide a computer-readable medium comprising computer-readable instructions that, upon being executed by a system, cause the system to perform the above method.

Various aspects of the present technology also provide a Media redundancy Interconnection Manager, MIM, having at least one interconnection port and two domain ring ports, configured to, when in a Link Check, LC, mode, and connected to an Interconnecting ring in an Interconnect-Open state, to which are further connected at least three Media redundancy Interconnection Clients, MICs:
- receive a first one of a first set of INLNK_UP MRP frames sent by any one of the MICs;
- send a second set of INLNK_UP MRP frames with a predetermined period between INLNK_UP MRP frames; and
- change to a Check Interconnection, Interconnection Closed State, CHK_IC, state and the Interconnecting ring to an Interconnect-Closed state, if it receives:
  - one of the INLNK_UP MRP frames from the second set; or
  - a second INLNK_UP MRP frame from the first set.

In aspects of the present technology, the predetermined period is approximately 50 mS.

In further aspects of the present technology, the MIM is configured to send INLNK_UP MRP frames of the second set through its interconnection port.

In further aspects of the present technology, the MIM is configured to receive INLNK_UP MRP frames of the first set through any of its domain ring ports or its interconnection port.

In further aspects of the present technology, the MIM is configured to receive INLNK_UP MRP frames of the second set through any of its domain ring ports.

In the context of the present description, unless expressly provided otherwise, a "processor" may refer, but is not limited to, any type of "computing system", "electronic device", "computer-based system", "controller unit", "monitoring device", "server" and/or any combination thereof appropriate to the relevant task at hand, in relation to receiving, storing, processing, and/or forwarding data.

In the context of the present specification, the expression "FPGA" is intended to include Field Programmable Gate Array computing systems, available on the market at the time of filing this patent application, such as references Xilinx VU9P, or Intel Stratix V, and any subsequent equivalent technologies becoming available, regardless of their name, consisting in computing system hardware programmable with software.

In the context of the present description, a "processor" may include a single dedicated processor, a single shared processor, or a plurality of individual processors, some of which may be shared. A "processor" may be a general purpose processor, such as a central processing unit (CPU), a processor dedicated to a specific purpose, or a processor implemented in a FPGA. Other hardware and software, conventional and/or custom, may also be included in a "processor".

In the context of the present description, unless expressly provided otherwise, the expression "memory" is intended to include Random Access storage systems, available on the market at the time of filing this patent application, and any subsequent equivalent technologies becoming available, regardless of their name, consisting in computing system media for storing digital information. An example of such memory may be a Quad Data Rate (QDR) Static Random Access Memory (SRAM).

In the context of the present description, the functional steps shown in the figures, may be provided through the use of dedicated hardware, as well as hardware capable of executing software in association with appropriate software.

Still in the context of the present description, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present description, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that, unless otherwise explicitly specified herein, the drawings are not to scale. Finally, elements that are identical from one drawing to the other bear the same numeral reference across drawings.

DETAILED DESCRIPTION

Figure 1:
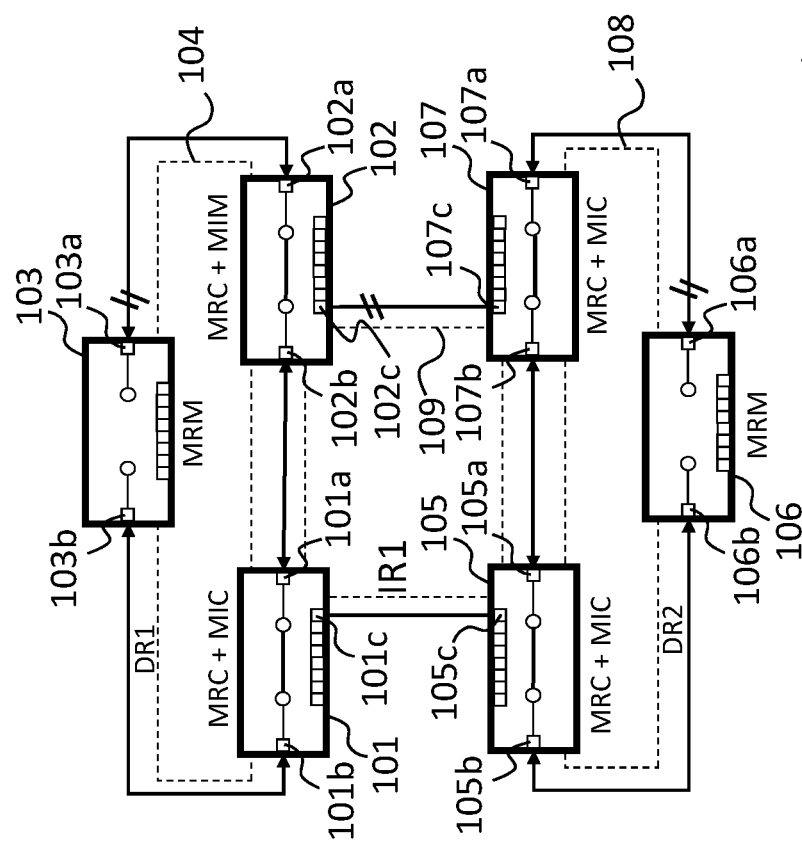
FIG. 1 depicts an environment (prior art) in which the present technology may be applied.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some aspects of the present technology, the processor may be a general purpose processor, such as a central processing unit (CPU) or a processor dedicated to a specific purpose, such as a digital signal processor (DSP). In the aforementioned, explicit use of the term a «processor» should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that «module» may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

Turning back to FIG. 1, let us assume IR1 109 is in the Interconnect-Closed state, and MIM 102 has its interconnection port (i.e.: 102c) in BLOCKED state. If one of the MICs, for example MIC 105, reboots/reloads for any reason (as a result of for example failure or reconfiguration), then MIM 102 goes to Interconnect-Open state and sets its interconnection port 102c in FORWARDING state. When the MIC 105 reboots/reloads however, there exists a possible scenario where:

the interconnect link between MICs 105 and 101 comes up before the MRP state-machine is started on freshly booted MIC 105, and as a result the interconnection port 105c is in BLOCKING state by default;

since MIC 101 has also got its interconnect link up event, it sends a INLNK_UP frame; and MIM 102 upon receiving this INLNK_UP frame will move to Interconnect-Closed state and set its interconnection port to BLOCKING state.

The entire Interconnecting ring IR1 109 is thus blocked, with no traffic flow until the MRP state-machine in MIC 105 is up and running again and reaches PT_IDLE state, upon which interconnection port 105c will be set to FORWARDING state. This degraded network mode of complete traffic drop may last typically anywhere between 1 to 30 seconds after reboot of MIC 105.

According to the present technology, MIM 102's MRP state machine and behavior are modified so as to reduce the time when Interconnecting ring IR1 109 remains in a degraded mode, by efficiently managing the Interconnecting ring IR1 109 transition from Interconnect-Open to Interconnect-Closed when configured in LC-mode.

Figure 2:
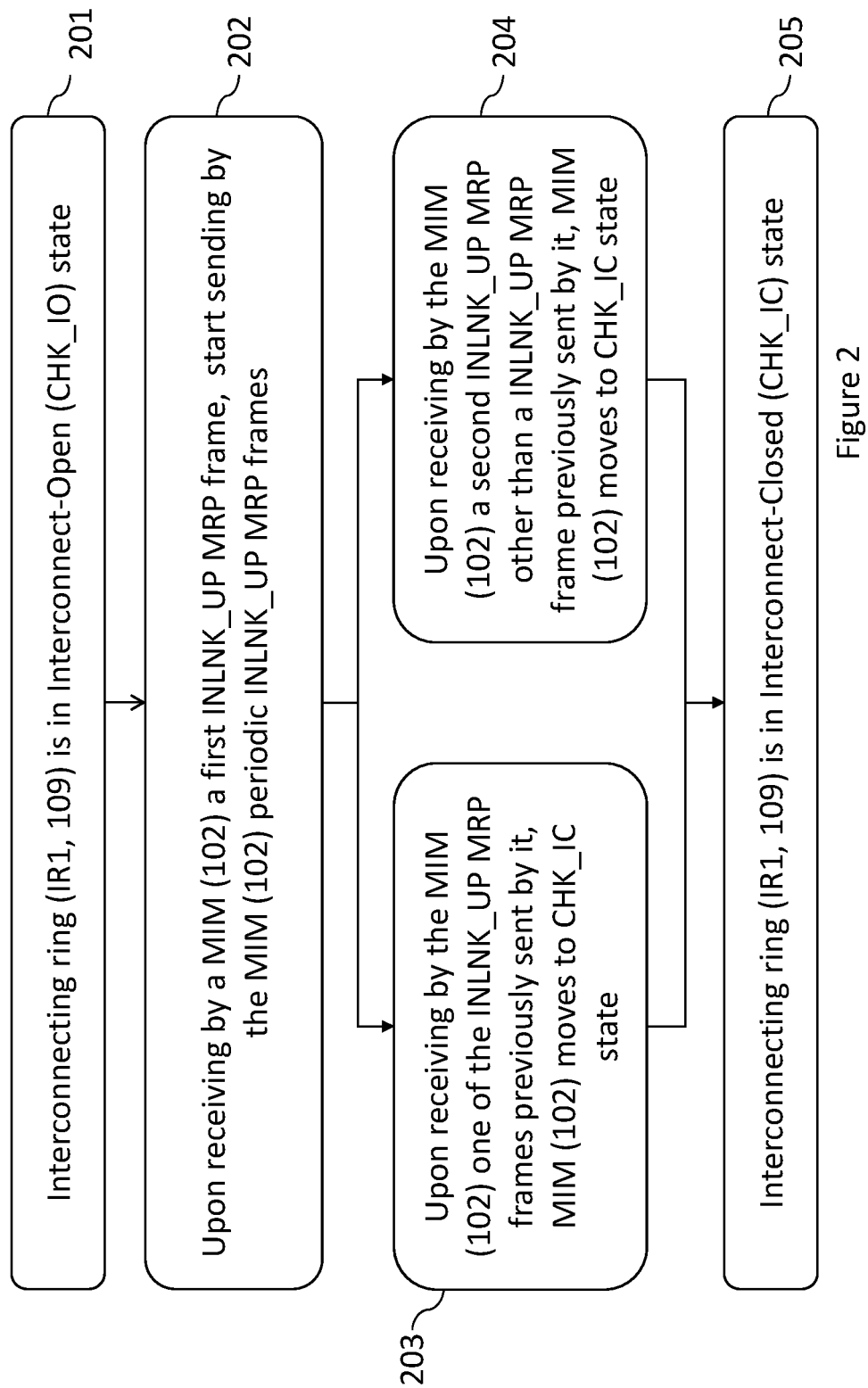
FIG. 2 details MRP state machine and behavior for a MIM according to the present technology.

FIG. 2 details such MRP state machine and behavior for a MIM according to the present technology. At step 201, IR1 109 is in Interconnect-Open State (Check Interconnection, Interconnection Open State, CHK_IO) state, with MIM 102 moving to, CHK_IO, state, as a result of a link or switch failure in IR1 109.

At step 202, if MIM 102 receives a first INLNK_UP MRP frame, it starts sending its own INLNK_UP MRP frames on its interconnection port 102c, at periodic intervals.

Such a received first INLNK_UP MRP frame may be sent by any one of the MICs in IR1 109 (i.e.: 101, 105, 107), and is received by MIM 102 on any one of its domain ring ports 102a or 102b, or its interconnection port 102c.

The person skilled in the art will appreciate that, but for the present technology, MIM 102 would not send its own INLNK_UP MRP frames according to the prior art, including the MRP standard.

The periodicity at which the MIM 102 is sending its own INLNK_UP MRP frames may be, merely as an example and without limitation, 50 mS between successive INLNK_UP MRP frames, through its interconnection port 102c.

Two steps 203 and 204 are performed as part of the MRP state machine and behavior for MIM 102 according to the present technology. At step 203, if MIM 102 receives one of its own INLNK_UP MRP frames previously sent by it, it moves to Check Interconnection, Interconnection Closed State, CHK_IC, state.

Such received own INLNK_UP MRP frame may be received by MIM 102 on any one of its domain ring ports 102a or 102b.

The person skilled in the art knows how to implement recognition by MIM 102 that a received INLNK_UP MRP frame is one of the ones previously sent by it, for example based on mac-address in the frame.

At step 204, if MIM 102 receives a second INLNK_UP MRP frame, other than the first INLNK_UP MRP frame received by it at step 202, and other than one of the INLNK_UP MRP frames sent by it at step 202, it also moves to Check Interconnection, Interconnection Closed State, CHK_IC, state.

Such received second INLNK_UP MRP frame may be received by MIM 102 on any one of its domain ring ports 102a or 102b, or its interconnection port 102c.

The person skilled in the art knows how to implement recognition by MIM 102 that a received INLNK_UP MRP frame is both a second or subsequent INLNK_UP MRP frame sent by one of the MICs in IR1, and a INLNK_UP MRP frame other than one of the INLNK_UP MRP frames sent by it, for example through sequence numbering and mac-address in the frame.

The tests at steps 203 and 204 may be performed concurrently or sequentially (not represented) without departing from the scope of the present technology. It is sufficient for either one of the two tests to pass for MIM 102 to move to Check Interconnection, Interconnection Closed State, CHK_IC, state.

At step 205, MIM 102 having moved to CHK_IC state, per MRP standard, IR1 109 is moved to Interconnect-Closed state. This results in having IR1 109 in degraded mode for a much shorter duration compared to MRP standard. Thus, a method and a MIM with new and improved MRP state machine and behavior when in a Link Check, LC, mode, are provided according to the present technology for changing an Interconnecting ring, being in an Interconnect-Open state, to Interconnect-Closed state, consisting in:
the MIM receiving a first one of a first set of INLNK_UP MRP frames comprised of frames sent by any one of the MICs;
the MIM sending successive frames from a second set of INLNK_UP MRP frames comprised of frames sent by the MIM, with a predetermined period between successive frames; and
the MIM changing to a Check Interconnection, Interconnection Closed State, CHK_IC, state and the Interconnecting ring to an Interconnect-Closed state, if the MIM receives:
one of the INLNK_UP MRP frames from the second set; or
a second INLNK_UP MRP frame from the first set.

Figure 3:
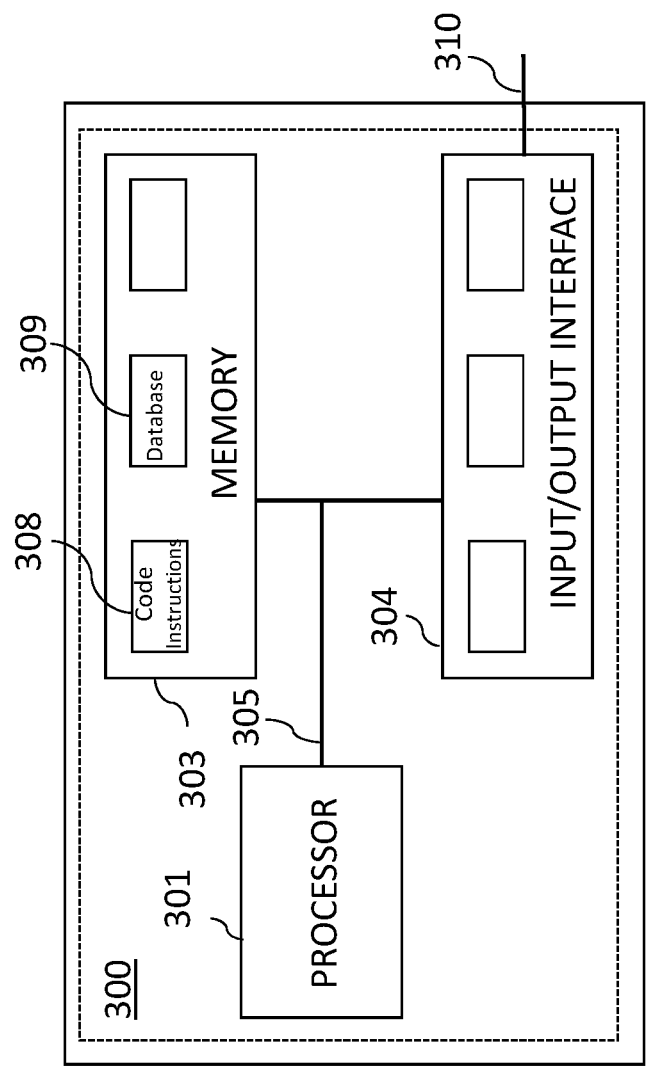
FIG. 3 illustrates a computing system that may be used in the present technology.

FIG. 3 illustrates a computing system that may be used in the present technology, for example in any one or all of the MIMs, MICs, MRMs and MRCs (101-103, 105-107) of FIG. 1, and which may be configured to execute the MIM (102) steps of FIG. 2. As will be appreciated by the person skilled in the art, such computing system may be implemented in any other suitable hardware, software, and/or firmware, or a combination thereof, and may be a single physical entity, or several separate physical entities with a distributed functionality.

In some aspects of the present technology, the Computing system 300 may comprise various hardware components including one or more single or multi-core processors collectively represented by a Processor 301, a Memory 303 and an Input/output interface 304. In this context, the Processor 301 may or may not be included in a FPGA. In some other aspects, the Computing system 300 may be an "off the shelf" generic computing system. In some aspects, the Computing system 300 may also be distributed amongst multiple systems. The Computing system 300 may also be specifically dedicated to the implementation of the present technology. As a person in the art of the present technology may appreciate, multiple variations as to how the Computing system 300 is implemented may be envisioned without departing from the scope of the present technology.

Communication between the various components of the Computing system 300 may be enabled by one or more internal and/or external Buses 305 (e.g. a PCI bus, universal serial bus, IEEE 1394 "Firewire" bus, SCSI bus, Serial-ATA bus, ARINC bus, etc.), to which the various hardware components are electronically coupled.

The Input/output interface 304 may enable networking capabilities such as wire or wireless access. As an example, the Input/output interface 304 may comprise a networking interface such as, but not limited to, a network port, a network socket, a network interface controller and the like. Multiple examples of how the networking interface may be implemented will become apparent to the person skilled in the art of the present technology.

The Memory 303 may store Code instructions 308, such as those part of, for example, a library, an application, etc. suitable for being loaded into the Memory 303 and executed by the Processor 301 for implementing the method and process steps according to the present technology. The Memory 303 may also store a Database 309. The person skilled in the art will appreciate that any of the Database 309, the Code instructions 308, and generally the Memory 303, may also, in aspects, physically reside outside of the Computing System 300, still within the scope of the present technology.

The Input/output interface 304 may allow Computing System 300 to be communicably connected to other processors through a Connection 310.

While the above-described implementations have been described and shown with reference to particular steps performed in a particular order, it will be understood that these steps may be combined, sub-divided, or re-ordered without departing from the teachings of the present disclosure. At least some of the steps may be executed in parallel or in series. Accordingly, the order and grouping of the steps is not a limitation of the present technology. It should further be expressly understood that not all technical effects mentioned herein need to be enjoyed in each and every aspect of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of changing an Interconnecting ring, from Interconnect-Open to Interconnect-Closed state, wherein the Interconnecting ring comprises a Media redundancy Interconnection Manager, MIM, and at least three Media redundancy Interconnection Clients, MICs, the MIM being in a Link Check, LC, mode, the method comprising, upon the Interconnecting ring being in an Interconnect-Open state:
   receiving by the MIM a first one of a first set of Interconnect Link Up, INLNK_UP MRP, frames sent by any one of the MICs;
   sending by the MIM a second set of INLNK_UP MRP frames with a predetermined period between INLNK_UP MRP frames; and
   changing by the MIM to a Check Interconnection, Interconnection Closed State, CHK_IC, state and the Interconnecting ring to an Interconnect-Closed state, if the MIM receives:
      one of the INLNK_UP MRP frames from the second set; or
      a second INLNK_UP MRP frame from the first set.

2. The method of claim 1, wherein the predetermined period is approximately 50 mS.

3. The method of claim 1, wherein the MIM sends INLNK_UP MRP frames of the second set through its interconnection port.

4. The method of claim 1, wherein the MIM receives INLNK_UP MRP frames of the first set through any of its domain ring ports or its interconnection port.

5. The method of claim 1, wherein the MIM receives INLNK_UP MRP frames of the second set through any of its domain ring ports.

6. A non-transitory computer-readable medium comprising computer-readable instructions that, upon being executed by a system, cause the system to perform the method of claim 1.

7. A Media redundancy Interconnection Manager, MIM, having at least one interconnection port and two domain ring ports, configured to, when in a Link Check, LC, mode, and connected to an Interconnecting ring in an Interconnect-Open state, to which are further connected at least three Media redundancy Interconnection Clients, MICs:
   receive a first one of a first set of Interconnect Link Up, INLNK_UP MRP, frames sent by any one of the MICS;
   send a second set of INLNK_UP MRP frames with a predetermined period between INLNK_UP MRP frames; and
   change to a Check Interconnection, Interconnection Closed State, CHK_IC, state and the Interconnecting ring to an Interconnect-Closed state, if it receives:
      one of the INLNK_UP MRP frames from the second set; or
      a second INLNK_UP MRP frame from the first set.

8. The MIM of claim 7, wherein the predetermined period is approximately 50 mS.

9. The MIM of claim 7, further configured to send INLNK_UP MRP frames of the second set through its interconnection port.

10. The MIM of claim 7, further configured to receive INLNK_UP MRP frames of the first set through any of its domain ring ports or its interconnection port.

11. The MIM of claim 7, further configured to receive INLNK_UP MRP frames of the second set through any of its domain ring ports.

* * * * *